(12) United States Patent
Al Amri et al.

(10) Patent No.: US 12,296,460 B2
(45) Date of Patent: May 13, 2025

(54) LIVE INSPECTOR ROBOT

(71) Applicant: SAUDI ARABIAN OIL COMPANY, Dhahran (SA)

(72) Inventors: Abdullah Mohammed Al Amri, Dammam (SA); Radwan Abdullah Basalamah, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 115 days.

(21) Appl. No.: 18/362,471

(22) Filed: Jul. 31, 2023

(65) Prior Publication Data
US 2025/0042042 A1 Feb. 6, 2025

(51) Int. Cl.
| | | |
|---|---|---|
| *B25J 13/00* | (2006.01) | |
| *B25J 5/00* | (2006.01) | |
| *B25J 11/00* | (2006.01) | |
| *B25J 13/08* | (2006.01) | |
| *B25J 19/02* | (2006.01) | |

(52) U.S. Cl.
CPC .......... *B25J 11/008* (2013.01); *B25J 5/005* (2013.01); *B25J 13/006* (2013.01); *B25J 13/087* (2013.01); *B25J 19/023* (2013.01)

(58) Field of Classification Search
CPC ........ B25J 11/008; B25J 5/005; B25J 13/006; B25J 13/087; B25J 19/023
See application file for complete search history.

(56) References Cited

U.S. PATENT DOCUMENTS

| | | | |
|---|---|---|---|
| 4,360,222 A | 11/1982 | Fisher | |
| 8,773,525 B2 * | 7/2014 | Lortie | E21B 47/002 |
| | | | 348/85 |
| 9,205,554 B2 * | 12/2015 | Hayden | A01G 23/0955 |
| 11,504,850 B2 | 11/2022 | Bryner et al. | |

(Continued)

FOREIGN PATENT DOCUMENTS

| | | |
|---|---|---|
| WO | 2009/073708 A1 | 6/2009 |
| WO | 2017/084983 A1 | 5/2017 |
| WO | 2021/196529 A1 | 10/2021 |

OTHER PUBLICATIONS

DeValult, Robotic system for underwater inspection of bridge piers, 2000, IEEE, p. 32-37 (Year: 2000).*

(Continued)

*Primary Examiner* — McDieunel Marc
(74) *Attorney, Agent, or Firm* — Osha Bergman Watanabe & Burton LLP

(57) ABSTRACT

In one aspect, a robot is disclosed for performing inspection in a facility. The robot includes a plurality of wheels, a pneumatic motor configured to drive the plurality of wheels, a transmission, and an air tank configured to supply compressed air to the pneumatic motor. The robot further includes an air compressor configured to fill the air tank with the compressed air, an extended life battery that provides power to the air compressor, a solar panel that provides power and one or more sensors. Additionally, the robot includes a processor that controls the one or more sensors to acquire inspection data and controls the pneumatic motor to position the robot within an inspection range of an inspection item, and a transceiver is coupled to the processor that receives control signaling and transmits inspection data to the operator control room.

20 Claims, 7 Drawing Sheets

(56) References Cited

U.S. PATENT DOCUMENTS

| | | | |
|---|---|---|---|
| 11,850,726 B2* | 12/2023 | Bryner | B25J 9/1653 |
| 12,162,160 B2* | 12/2024 | Pinero | G05D 1/0016 |
| 2011/0049909 A1 | 3/2011 | Domes | |
| 2012/0215348 A1 | 8/2012 | Skrinde | |
| 2024/0053748 A1* | 2/2024 | Wurden | G05D 1/0088 |

OTHER PUBLICATIONS

Park et al., Development of the untethered in-pipe inspection robot for natural gas pipelines, 2013, IEEE, p. 55-58 (Year: 2013).*

Choi et al., Service robots: An industrial perspective, 2015, IEEE, p. 1-6 (Year: 2015).*

Akhtaruzzaman et al., Design and development of a wall climbing Robot and its control system, 2009, IEEE, p. 309-313 (Year: 2009).*

International Search Report issued for corresponding international patent application No. PCT/US2024/040002, mailed Dec. 10, 2024 (7 pages).

Written Opinion issued for corresponding international patent application No. PCT/US2024/040002, mailed Dec. 10, 2024 (9 pages).

Gargade, Atul et al., "Modelling and Analysis of Pipe Inspection Robot"; International Journal of Emerging Technology and Advanced Engineering; vol. 3, Issue 5; pp. 121-126; May 2013 (7 pages).

Kaur, Palwinder et al., "Pipeline Inspection and Borewell Rescue Robot"; IJRET: International Journal of Research in Engineering and Technology; vol. 3, Issue 4; pp. 726-729; Apr. 2014 (4 pages).

Yahya, Nur Afiqah Binti Haji et al., "Development and Adaptability of In-Pipe Inspection Robots"; IOSR Journal of Mechanical and Civil Engineering (IOSR-JMCE); vol. 11, Issue 4, Version VII; pp. 1-8; Jul.-Aug. 2014 (8 pages).

Nayak; Ankit et al., "Design of a New In-Pipe Inspection Robot"; Procedia Engineering; 12th Global Congress on Manufacturing and Management, GCMM 2014; vol. 97; pp. 2081-2091; 2014 (11 pages).

Fritzing, "Welcome to Fritzing"; <https://fritzing.org/>; Accessed Jul. 28, 2023 (2 pages).

Min, Junghu et al., "Development and Controller Design of Wheeled-Type Pipe Inspection Robot"; 2014 International Conference on Advances in Computing, Communications and Informatics (ICACCI); pp. 789-795; 2014 (7 pages).

Schoonard, J. W. et al., "Studies of Visual Inspection"; Ergonomics; vol. 16, Issue 4; pp. 365-379; Jul. 1973 (15 pages).

Kim, Jong-Hoon et al., "FAMPER: A Fully Autonomous Mobile Robot for Pipeline Exploration"; 2010 IEEE International Conference on Industrial Technology; pp. 517-523; 2010 (7 pages).

Loupos, Konstantinos et al., "Robotic Intelligent Vision and Control for Tunnel Inspection and Evaluation—The Robinspect Ec Project"; 2014 IEEE International Symposium on Robotic and Sensors Environments (ROSE) Proceedings; pp. 72-77; 2014 (6 pages).

Miura, Hiroyasu et al., "Field experiment report for tunnel disaster by investigation system with multiple robots"; 2016 IEEE International Symposium on Safety, Security, and Rescue Robotics (SSRR); pp. 276-277; 2016 (2 pages).

Elankavi, Rajendran Sugin et al., "Modelling and Implementation of Out-Pipe Inspection Robot"; 2022 4th International Conference on Inventive Research in Computing Applications (ICIRCA); pp. 18-23; 2022 (6 pages).

Yadav, R. A. et al., "Design and Manufacturing of Pipe Inspection Robot"; IOSR Journal of Engineering (IOSR JEN); Special Issue; pp. 46-49; Jun. 2019 (4 pages).

Hajjaj, Sami Salama Hussen et al., "Design and Development of an Inspection Robot for Oil and Gas Applications"; International Journal of Engineering & Technology; vol. 7, No. 4.35: Special Issue 35; pp. 5-10; 2018 (6 pages).

Prinsen, Thomas H., "Design and Analysis of a Solar-Powered Compressed Air Energy Storage System"; A thesis submitted in partial fulfillment of the requirements for the degree of Master os Science in Mechanical Engineering; Naval Postgraduate School; pp. i-65; Dec. 2016 (90 pages).

Birch, Matthew C. et al., "A Miniature Hybrid Robot Propelled by Legs"; Proceedings 2001 IEEE/RSJ International Conference on Intelligent Robots and Systems, Expanding the Societal Role of Robotics in the the Next Millennium (Cat. No. 01CH37180); pp. 845-851; 2001 (7 pages).

Rangel, Johannes et al., "Gas Leak Inspection Using Thermal, Visual and Depth Images and a Depth-Enhanced Gas Detection Strategy"; Revista de Ingeniería; No. 42; pp. 8-15; Jan.-Jun. 2015 (8 pages).

Aliff, Mohd et al., "Development of Pipe Inspection Robot using Soft Actuators, Microcontroller and LabVIEW"; (IJACSA) International Journal of Advanced Computer Science and Applications; vol. 13, Issue 3; pp. 349-354; 2022 (6 pages).

* cited by examiner

LIVE INSPECTOR ROBOT

BACKGROUND

Robots may be used in consumer and professional activities such as photography, cartography, inspection of industrial objects, or military operations. Among these applications, a robot may be outfitted with a variety of sensor and communication packages. Robots may also be effectively utilized for surveys and remote object inspection.

Currently, field operators are used to inspect facilities for gas leaks, corrosion, or other detrimental conditions. Thus, survey of a facility requires significant human capital, time, and expense traversing complicated structures. Moreover, some facilities are structured in such a way that inspection by a human is difficult or impossible due to, for example, space constraints. In addition, the potential for human injury during the survey process increases over the number of items and facilities surveyed.

Accordingly, utilizing one or more robots to conduct inspection of various items in a facility may increase efficiency while decreasing expense and the risk of potential human injury.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to robot for performing inspection in a facility having an operator control room. The robot includes: a plurality of wheels; a pneumatic motor configured to drive the plurality of wheels; a transmission connected to the pneumatic motor and the plurality of wheels; an air tank configured to supply compressed air to the pneumatic motor; an air compressor configured to fill the air tank with the compressed air; an extended life battery that provides power to the air compressor; a solar panel that provides power to at least one of the extended life battery and the air compressor; one or more sensors; a processor that controls the one or more sensors and the pneumatic motor to position the robot within an inspection range of an inspection item, wherein the processor further controls the one or more sensors to acquire inspection data from the inspection item; and a transceiver coupled to the processor that receives control signaling and transmits the inspection data to the operator control room.

In another aspect, embodiments disclosed herein relate to a method for operating a robot that performs inspection in a facility having an operator control room. The method includes: connecting the robot to a network and launching the robot in the facility; receiving control signaling from the operator control room to initiate scanning; scanning an environment of the facility to locate an inspection item; autonomously driving the robot to the inspection item and aligning the robot within an inspection range of the inspection item; performing a scan of the inspection item to acquire inspection data; and transmitting the inspection data to the operator control room.

In another aspect, embodiments disclosed herein relate to a non-transitory computer readable medium (CRM) storing instructions for performing operation of a robot that performs inspection in a facility having an operator control room. The operation including: connecting the robot to a network and launching the robot in the facility; receiving control signaling from the operator control room to initiate scanning; scanning an environment of the facility to locate an inspection item; autonomously driving the robot to the inspection item and aligning the robot with the inspection item for scanning; performing a scan of the inspection item to acquire inspection data; and transmitting the inspection data to the operator control room.

Other aspects and advantages of the claimed subject matter will be apparent from the following description and the appended claims.

DETAILED DESCRIPTION

Figure 1:
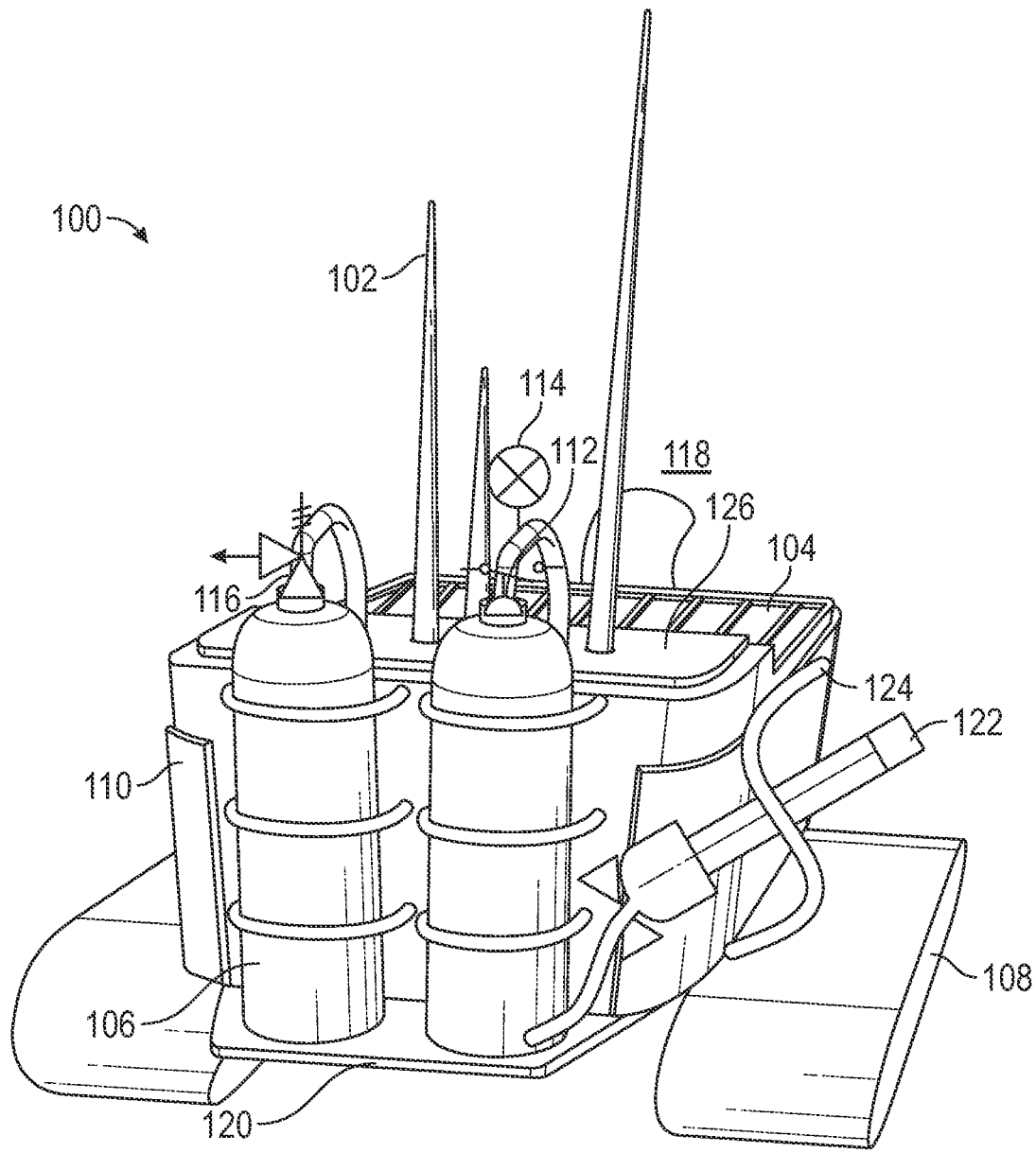
FIG. 1 shows a robot in accordance with one or more embodiments.

In the following detailed description of embodiments of the disclosure, numerous specific details are set forth to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Robots are useful devices in the oil and gas industry for inspection or surveillance of oil and gas assets. For example, an oil and gas asset may be a facility having various pipes, tanks, or other inspection items requiring routine inspection. An operator may instruct a robot to inspect an inspection item and determine a status based on, for example, various pressure, temperature, corrosion, gas type, gas concentration, material thickness, or any other aspect that requires inspection. In addition, the robot may be utilized to perform visual inspection of the facility and inspection items.

One or more embodiments disclosed herein provide a robot that can continuously traverse a facility to perform inspection. The robot may be piloted by an operator or may perform inspection data collection and status determination programmatically.

FIG. 1 shows an example of a robot (100) according to one or more embodiments. In one or more embodiments, the robot (100) may be referred to as a live inspection robot (LIR). The robot (100) includes an antenna (102), a solar panel (104), an air tank (106), and wheels (108). In some embodiments, the antenna (102) further includes transmitting and/or receiving circuitry that may be operatively combined and referred to collectively as a transceiver. In some embodiments, the robot (100) may have multiple antennas (102) that may employ various wireless communication technologies such as Bluetooth, Wi-Fi, and other suitable technologies compatible with communicating control and data signals to and from the robot (100).

The solar panel (104) collects light from the environment and converts the light to electrical energy. The electrical energy generated by the solar panel (104) may be stored in a lithium battery (126), used to operate an air compressor (110), or operate other systems of the robot such as drive systems (e.g., wheels 108) or motors connected thereto) or control systems (e.g., processors, transceivers, and memory).

The air tank (106) stores compressed air that may be supplied to one or more pneumatic motors (120) connected to the wheels (108). The air tank (106) may be filled with compressed air by way of an air compressor (110) powered by the solar panel (104). The robot (100) may also include a purging air tube (122) to clear debris or other obstructions from a path. The purging air tube (122) may be connected by one or more valves and tubes to the air tank (106). The purging air tube (122) may, for example, be configured to clear debris in front of the tracks or wheels (108) of the robot (100). In one or more embodiments, the air tank (106) may also include one or more pressure relief valves (116) to relieve excess pressure if the system exceeds an intended maximum. The air tank (106) may also include a pressure switch (112) that senses the current pressure in the system such that the controller may control operation of the air compressor (110). The air tank (106) may also include one or more pressure gauges (114) to indicate pressure and one or more pressure regulators to regulate pressure. The one or more pressure regulators may be integrated into the pressure gauge (114). The air tank (106) may also include one or more pressure relief valves (116) to relieve excess tank pressure.

The wheels (108) may be operated by one or more motors (e.g., electric or pneumatic) or connected to one or more pneumatic motors (120) by way of a transmission coupling (not pictured). In one or more embodiments, the air compressor (110) is configured to mechanically push the robot using a pneumatic motor (120) by rotating the transmission coupling, thereby pushing the magnetic wheels of robot. In one or more embodiments, the wheels (108) may alternatively be tracks or tracks may be disposed around subsets of the wheels. For example, two wheels on a left side of the robot may drive a first track and two wheels on a right side of the robot may drive a second track. The wheels (108) may also be magnetic allowing the robot (100) to attach to various metallic surfaces for traversal. Further, in one or more embodiments, the robot (100) has a front axle and a rear axle with four tires of adhesive type to stick to uneven surfaces and is controlled wirelessly via any suitable means, such as WiFi.

The robot (100) further includes a sensor (118). In one or more embodiments, the sensor (118) may be a variety of sensors including cameras, thermal cameras, gas detection sensors, proximity sensors, temperature sensors, radar, LiDAR, ultrasonic sensors, and any other sensors suitable for allowing the robot (100) navigate the environment or perform inspection of inspection items such as pipes and vessels disposed through the environment.

The robot (100) may include a plurality of sensors such that multiple aspects of the environment may be detected and multiple aspects of an inspection item may be inspected. The robot (100) may also include any number of wheels or tracks allowing the robot (100) to traverse complex environments that may include obstacles such as uneven surfaces. Further, the robot (100) may be designed in a variety of sizes. For example, the robot (100) may have dimensions such as a length of 12 inches, a width of 8 inches, and a height of 10 inches, allowing the robot (100) to inspect areas necessitating smaller sizes that may not be accessible by humans or the human hand for handheld instruments. On the other hand, the robot (100) may also have larger dimensions to allow the robot (100) to inspect items requiring a larger size such that a human would not typically be able to reach the item. Alternatively, a smaller size robot (100) may have one or more articulating and/or telescoping arms attached to the one or more sensors (118) allowing the robot (100) to reach difficult to inspect areas.

The robot (100) shown in FIG. 1 has three power sources: a battery, compressed air, and the solar power system. The power sources of the robot may operate cooperatively. For example, the robot may recycle power utilizing a return wire (124) from the magnetic wheels to energize, to regulate, and/or to equalize the power of solar system. Although depicted externally, in some embodiments the return wire (124) may be internal to the robot (100).

In one or more embodiments, the live inspection robot (LIR) (100) is configured to move remotely on dedicated channels to inspect industrial plant pipes and vessels with narrow spaces that are difficult to reach by humans inside industrial plants. This will result in saving time, effort and cost in examining these pipes and proactively protect the oil and gas facilities from any leakages that could cause disasters.

In one or more embodiments, the robot (100) is operated by software developed using an Integrated Development Environment (IDE). For example, an Arduino IDE may be utilized to develop and generate code using an embedded C programming language. However, other suitable IDEs and embedded programming languages may be utilized for programming the robot (100). In addition, the robot (100) may utilize one or more messenger protocols to communicate control and data information to an operator. For example, the robot (100) may implement the Message Queuing Telemetry Transport (MQTT) protocol used to communicate between Internet of Things (IoT) devices. More specifically, the robot (100) may use one or more communication interfaces implementing the MQTT protocol to transfer control and data information between the robot (100) and an operator or server. The robot (100) may, for example, utilize WiFi to transmit messages using the MQTT protocol.

Figure 2A:
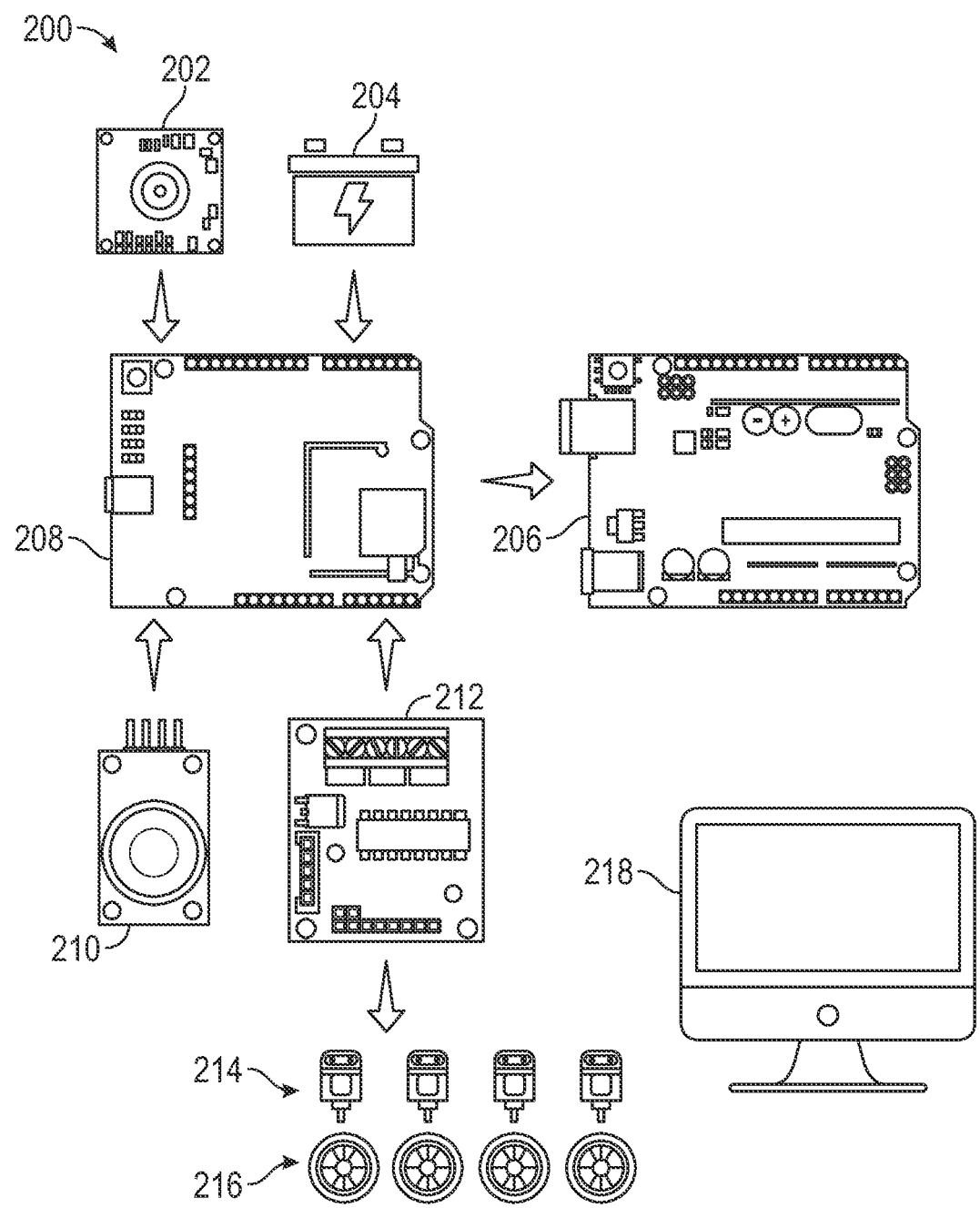
FIG. 2A shows robot subsystems in accordance with one or more embodiments.

FIG. 2A shows an example of robot systems (200) in accordance with one or more embodiments. That is, FIG. 2A demonstrates the subsystems for operating the robot (100) or for transmitting and receiving data signaling and control signaling to and from the robot (100). In one or more embodiments, subsystems of the robot (100) may be discrete components. In one or more embodiments, the robot systems (200) include a camera (202), a battery (204), a microcontroller (206), and a communication module (208). Each of the aforementioned systems is described in detail below.

The camera (202) may be a suitable image sensor integrated with a lens, control electronics, and an interface for control and data signaling. The battery (204) may be an extended life battery allowing the robot to operate continuously. The microcontroller (206) may be one or more of a processor, a Field Programmable Gate Array (FPGA), or other off-the-shelf microcontroller kits that may include open-source hardware or software. The communication module (208) may support one or more of a variety of communication standards such as Wi-Fi, Bluetooth, and other suitable technologies compatible with communicating control and data signals to and from the robot (100).

The robot systems (200) further include a sensor (210), a motor controller (212), motors (214), and wheels (216). The sensor (210) may be one or more of a variety of sensors including cameras, thermal cameras, gas detection sensors, proximity sensors, temperature sensors, radar, LiDAR, ultrasonic sensors, and any other sensors suitable for allowing the robot (100) navigate the environment or perform inspection of inspection items disposed through the environment. For example, the sensor (210) may be a gas sensor suitable for detecting hydrogen sulfide ($H_2S$), liquified petroleum gas (LPG), methane ($CH_4$), and alcohol. In one or more embodiments, the sensor (210) may generate inspection data such as, for example, corrosion data, gas type data, gas concentration data, thickness data, or other data for determining the status of an inspection object.

The motor controller (212) controls one or more motors (214) that drive the wheels (216). The one or more motors (214) may be electric motors, pneumatic motors, or other motors suitable for driving the wheels (216) of the robot (100). In one or more embodiments, the wheels (216) may alternatively be tracks or tracks may be disposed around subsets of the wheels (216). For example, two wheels on a left side of the robot may drive a first track and two wheels on a right side of the robot may drive a second track.

In one or more embodiments, the systems associated with the robot (100) may also include a terminal (218). The terminal (218) may be located proximate to the robot (100) or may be located remotely. An operator may use the terminal (218) to control the operation of the robot (100). For example, the operator may use the terminal (218) to transmit control signals to the robot (100) and receive inspection data in return. The operator may use the terminal (218) to perform analysis of the inspection data to determine whether intervention may be required.

Figure 2B:
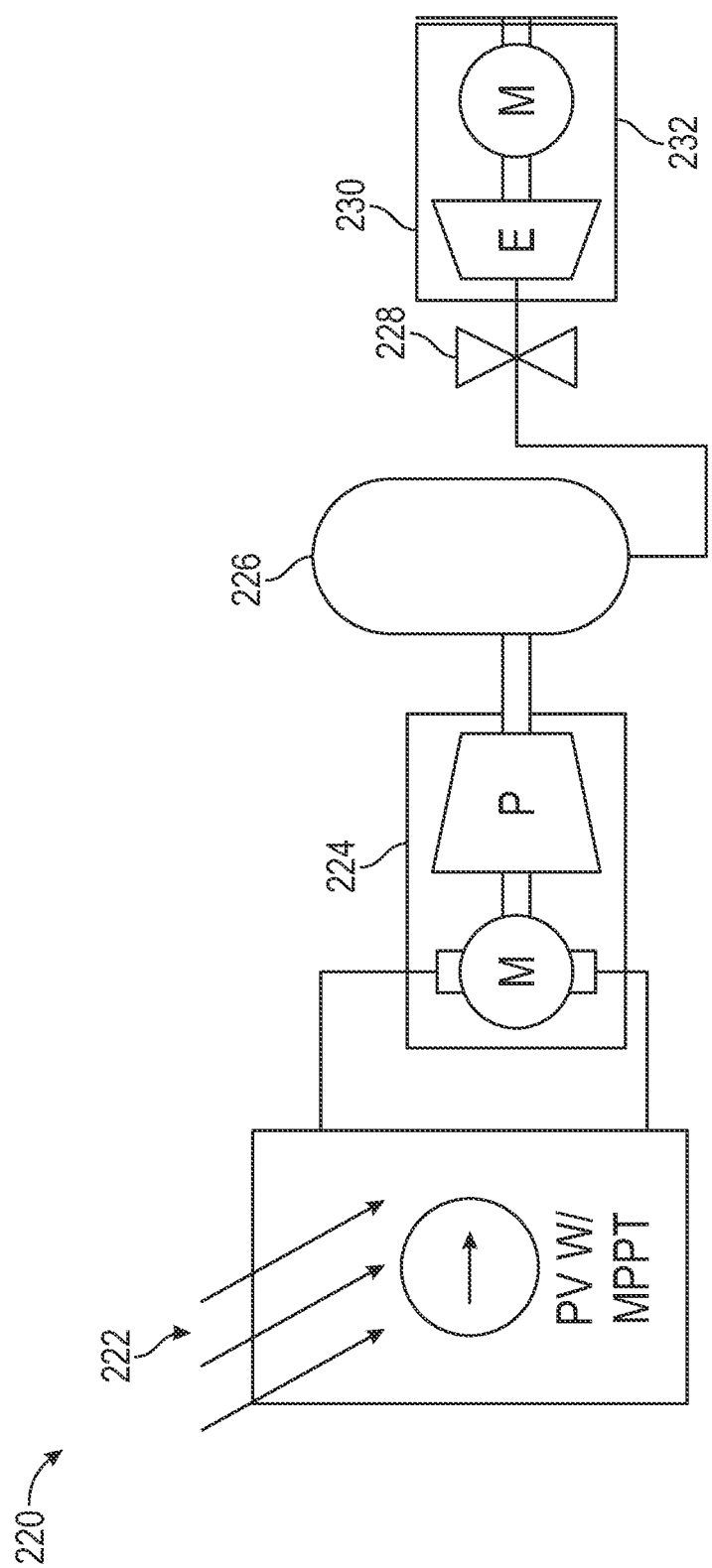
FIG. 2B shows power systems of the robot in accordance with one or more embodiments.

FIG. 2B shows power systems (220) of the robot in accordance with one or more embodiments. As mentioned above, the power systems (220) include three power sources: battery, solar, and compressed air. The power systems (220) shown in FIG. 2B include a solar panel (222) that generates electrical power stored in a connected battery. The solar panel (222) and/or battery are connected to a compressor (224) that compresses air to be stored in a storage tank (226). A valve (228) may be disposed in a connection between the storage tank (226) and an air motor (230) allowing the robot (100) to control actuation of the air motor (230). The air motor (230) may also be referred to interchangeably as a pneumatic motor. The air motor (230) may also be connected to a transmission (232) that transmits rotational power from the air motor (230) to wheels of the robot (100). For example, the transmission may include one or more gears or belts connecting to one or more axles of the robot to which the wheels are attached.

Figure 3:
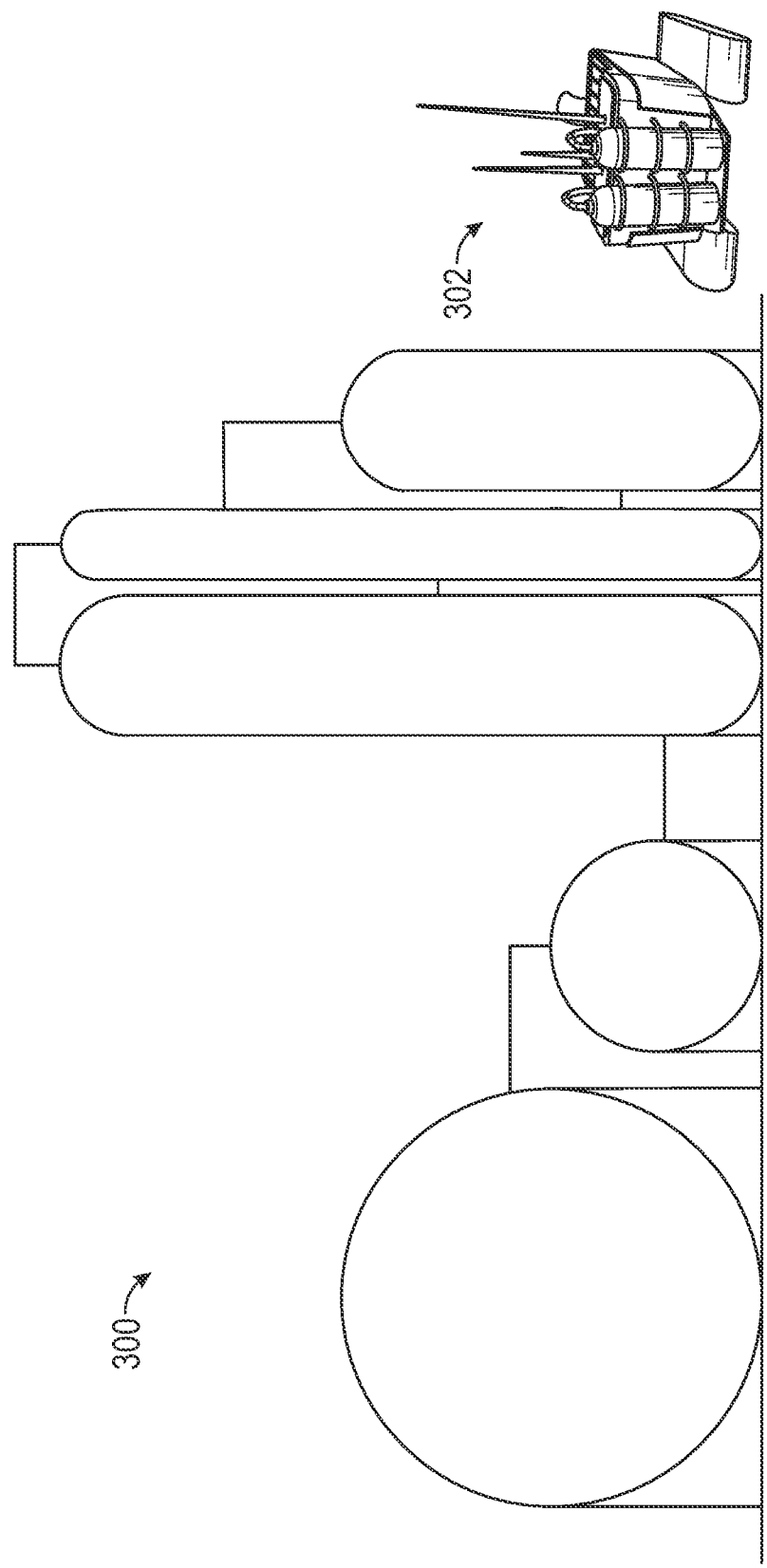
FIG. 3 shows a facility and robot in accordance with one or more embodiments.

FIG. 3 shows a facility (300) and the robot (302) in accordance with one or more embodiments. The facility (300) may, for example, be an indoor or outdoor oil and gas facility such as a chemical plant or refinery. The facility (300) may include a variety of storage and transport entities such as, for example, pipes, vessels and tanks that may be interconnected in a complex network. In other words, the facility (300) may have narrow spaces that are difficult to reach by humans to inspect the facility (300) for leakages. The robot (302) may traverse the facility freely or by way of dedicated channels to inspect the facility (300) pipes and vessels.

The robot (302) may either programmatically, or by way of operator instruction, traverse the facility (300). Program instructions for traversal by the robot (302) may be stored in dedicated memory on the robot (302). Solar panels absorbing light from the environment of the facility (300) (i.e., either artificial light or sunlight) may allow the robot (302) to continually perform inspection across the facility over a 24-hour period. In the event that debris or obstacles occur within the facility (300), the robot (302) may also include a purging air tube to clear or clean the path in front of or around the robot (302).

Figure 4:
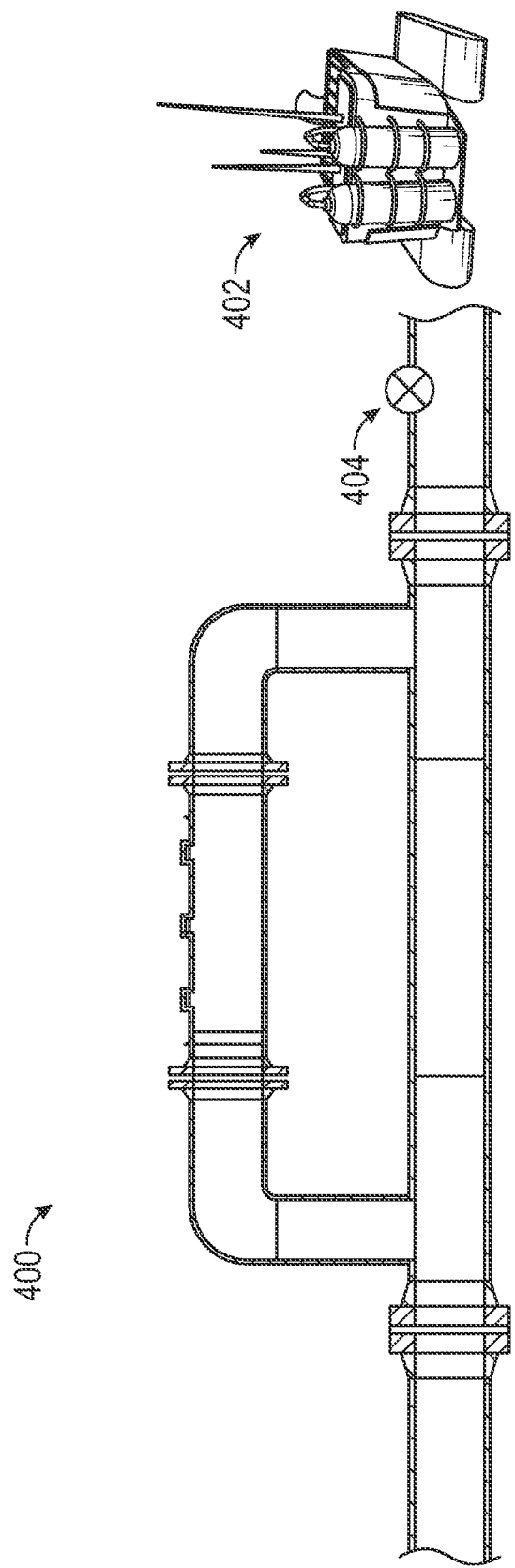
FIG. 4 shows a robot and a pipe system in accordance with one or more embodiments.

FIG. 4 shows a robot and a pipe system in accordance with one or more embodiments. An oil and gas facility may have a variety of interconnected pipes (400). The pipes (400) may provide for the transport of liquids and gases. However, due to corrosion, wear and tear, improperly seated connections, and other issues it is possible that dangerous leakages may occur from the pipes (400).

In one or more embodiments, the pipes (400) may have one or more inspection items (404) to be inspected by the robot (402). For example, an inspection item (404) may be a location of interest on a pipe. The inspection item (404) may also be a fitting, valve, or other type of connection requiring routine inspection by the robot (402).

Figure 5:
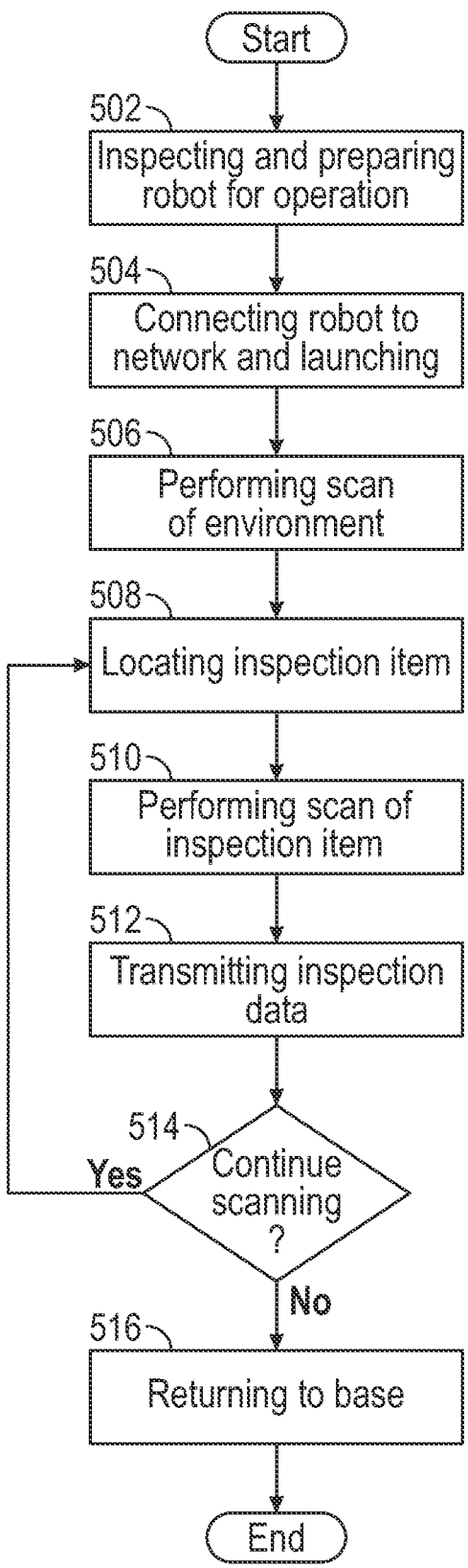
FIG. 5 shows a flowchart for a process of inspecting a facility in accordance with one or more embodiments.

FIG. 5 shows a flowchart for a process of inspecting a facility in accordance with one or more embodiments. In one or more embodiments, one or more of the steps shown in FIG. 5 may be omitted, repeated, and/or performed in a different order than the order shown in FIG. 5. Accordingly, the scope of the disclosure should not be considered limited to the specific arrangement of steps shown in FIG. 5. Steps 502 to 516 shown in FIG. 5 are explained below.

In Step 502, a robot, such as the robot (100) of FIG. 1, is inspected by an operator and prepared for operation. For example, the operator may visually inspect the robot for damage to the robot body, solar panels, or drive system and wheels. The operator may execute various diagnostics on the robot, ensure that the battery is attached and adequately charged, ensure that the solar panel is producing electricity, and other checks to ensure that the robot is ready for facility inspection. The operator may also load a program into a memory of the robot for execution. In addition, the robot is connected to WiFi via the communication module (208).

In Step 504, the robot is connected to a network and launched for facility inspection. The network may be, for example, an industrial Wi-Fi network, LTE/5G network, and the like. Upon launch, the robot begins traversing the facility. More specifically, in Step 504, the compressed air inside the air cylinder is released through a valve switch to move the pneumatic motor, which in turn moves the magnetic wheels of the inspector robot for traversal of the facility. The robot may follow a programmatic path for traversal. Alternatively, the operator may control the movement of the robot by way of a terminal. Further, the robot may follow a programmatic path with periodic operator intervention. The programmatic path may contain, for example, a list of inspection items throughout the facility requiring inspection. The list of inspection items may be arranged in a priority order, geographic order, or other order routing the robot's traversal throughout the facility. In the event that the path of the robot is obstructed by debris, the robot may use a purging air tube to clear or clean the path.

In Step 506, the robot performs a scan of the environment using one or more sensors such as a camera. More specifically, in Step 506, the thermal camera and gas sensors inspect the health conditions of the pipes and vessels. In one or more embodiments, the robot initiates the scan in response to control signaling from the operator to initiate scanning. The robot identifies one or more inspection items in the environment surrounding the robot. Alternatively, the operator may remotely specify one or more inspection items for the robot to attempt to scan in its environment.

In Step 508, the robot locates an inspection item of interest. For example, of the inspection items identified by the scan, the robot may select an inspection item from a list or alternatively an operator may specify an inspection item. The robot drives to the located inspection item and repositions in such a way to allow one or more sensors of the robot to inspect the inspection item. That is, the robot maneuvers such that it is positioned into an inspection range of the inspection item. In one or more embodiments, the robot may autonomously drive to the inspection item and align with the inspection range.

In Step 510, the robot performs inspection of the inspection item. Inspection may include, for example, determining a status of the inspection item based on, for example, pressure, temperature, corrosion, gas type, gas concentration, thickness data, or any other aspect that requires inspection. Inspection may include utilizing one or more of the sensors of the robot to acquire inspection data. The inspection data may be processed by the robot to determine a status of the inspection item. The status of an inspection item may be, for example, normal, recommended for follow-up inspection, critical, or non-operational (i.e., malfunctioning).

In Step 512, the collected inspection data is transmitted from the robot to a terminal. This information is transmitted to the field control operator to facilitate real-time data driven assurance of the quality of safety measures. The transmitted inspection data may include any identified statuses of the inspection item. Alternatively, an operator may evaluate the inspection data at the terminal. The operator may send control signals to the robot such as to perform further inspection or to proceed on a route.

In Step 514, the robot determines whether to continue scanning based on, for example, a program or an operator instruction. If the determination is made to continue scanning the robot may perform further inspection of the current inspection item or may continue on a route. In response to the robot continuing along a route, the process returns to Step 508. If the determination is made to not continue scanning, the process proceeds to Step 516.

In Step 516, the robot returns to a base. For example, the robot may return to an operator control room for shutdown, evaluation, recharging, or other inspection by the operator.

Those skilled in the art will appreciate that although the above Steps 502-520 are described with reference to an operator; however, such steps may also be performed programmatically. For example, the robot may store and execute instructions for performing Steps 502-516. Alternatively, a computer terminal may store a program for operating the robot in the manner described in Steps 502-516. Further, above Steps 502-516 may be performed iteratively over several environments within a facility and/or several facilities.

Further, one or more embodiments disclosed herein for operating the robot, for example with reference to FIG. 5, may be implemented on virtually any type of computer system, regardless of the platform being used. Alternatively, a computer system as described in FIG. 6 below may be part of the hardware and software that make up the microcontroller (206) and communication module (208). For example, the computer system may be one or more mobile devices (e.g., laptop computer, smart phone, personal digital assistant, tablet computer, or other mobile device), desktop computers, servers, blades in a server chassis, or any other type of computer system that includes at least the minimum processing power, memory, and input and output device(s) to perform one or more embodiments of the invention.

Figure 6:
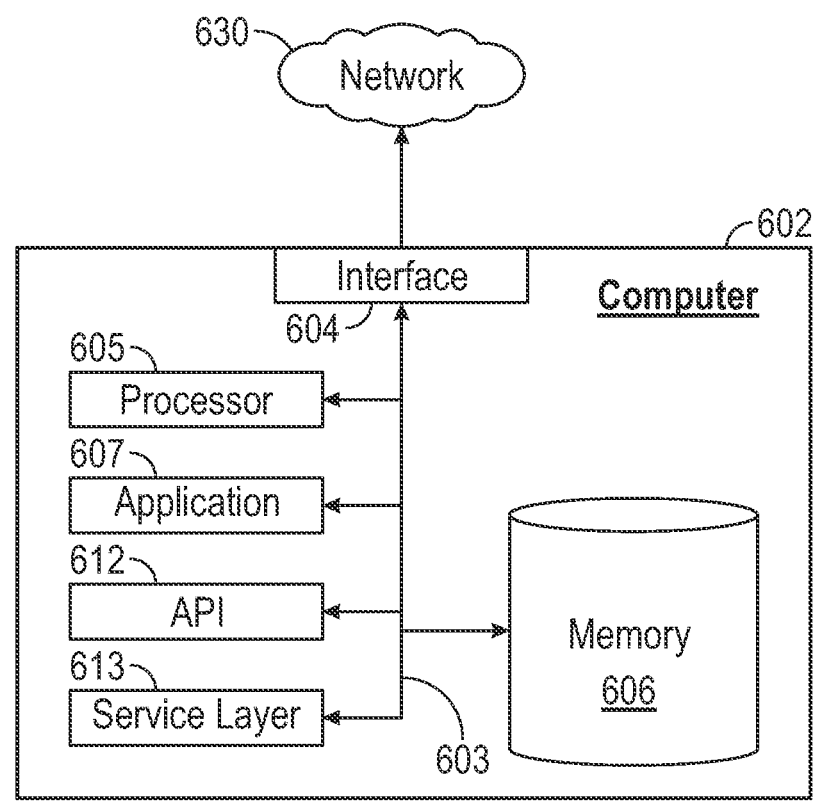
FIG. 6 shows a computer system for operating a robot in accordance with one or more embodiments.

An example of the computer system is described with reference to FIG. 6, in accordance with one or more embodiments. FIG. 6 is a block diagram of a computer system used to provide computational functionalities associated with described algorithms, methods, functions, processes, flows, and procedures as described in the instant disclosure, according to an implementation. The illustrated computer (602) in the computer system is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613)). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer (613). Software services, such as those provided by the service layer (613), provide reusable, defined business functionalities through a defined interface. For example, the interface may be software written in JAVA, C++, Python, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602). In one example, the method described with reference to FIG. 4 may be implemented by the application (607).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602). Furthermore, in one or more embodiments, the computer (602) is a non-transitory computer readable medium (CRM).

Embodiments of the present disclosure may provide at least one of the following advantages: allowing for the inspection of pipes and vessels in facilities where not necessarily accessible by humans or by the human hand; checking pipes and vessels that contain toxic gases or liquids; avoiding disasters due to leakage; identifying leaks and rust spots early to avoid critical issues; remotely determining proportions of gases inside pipes or vessels; saving time, money, and effort of human capital; and establishing clear records that may be stored in a database.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A robot for performing inspection in a facility having an operator control room, comprising:
   a plurality of wheels;
   a pneumatic motor configured to drive the plurality of wheels;
   a transmission connected to the pneumatic motor and the plurality of wheels;
   an air tank configured to supply compressed air to the pneumatic motor;
   an air compressor configured to fill the air tank with the compressed air;
   an extended life battery that provides power to the air compressor;
   a solar panel that provides power to at least one of the extended life battery and the air compressor;
   one or more sensors;
   a processor that controls the one or more sensors and the pneumatic motor to position the robot within an inspection range of an inspection item,
      wherein the processor further controls the one or more sensors to acquire inspection data from the inspection item; and
   a transceiver coupled to the processor that receives control signaling and transmits the inspection data to the operator control room.

2. The robot according to claim 1, wherein the inspection item is at least one of a pipe and a tank.

3. The robot according to claim 2, wherein the processor determines a status of the inspection item, and wherein the transceiver transmits the status to the operator control room.

4. The robot according to claim 3, wherein the one or more sensors include a thermal camera, and wherein the inspection data includes at least one of a thickness data and a corrosion data.

5. The robot according to claim 3, wherein the one or more sensors include a gas sensor, and wherein the inspection data includes at least one of a gas type data and a gas concentration data.

6. The robot according to claim 1, wherein the plurality of wheels are magnetic.

7. The robot according to claim 1, further comprising:
   a first track disposed around a first subset of the plurality of wheels; and
   a second track disposed around a second subset of the plurality of wheels.

8. The robot according to claim 1, further comprising:
   a purging air tube configured to clean a route in front of the plurality of wheels.

9. A method for operating a robot that performs inspection in a facility having an operator control room, the method comprising:
   connecting the robot to a network and launching the robot in the facility;
   receiving control signaling from the operator control room to initiate scanning;
   scanning an environment of the facility to locate an inspection item;
   autonomously driving the robot to the inspection item and aligning the robot within an inspection range of the inspection item;
   performing a scan of the inspection item to acquire inspection data; and
   transmitting the inspection data to the operator control room.

10. The method according to claim 9, wherein the inspection item is at least one of a pipe and a tank.

11. The method according to claim 10, further comprising:
    determining a status of the inspection item based on the inspection data; and
    transmitting the status to the operator control room.

12. The method according to claim 11, further comprising:
    determining at least one of a thickness data and a corrosion data based on the inspection data.

13. The method according to claim 11, further comprising:
    determining at least one of a gas type data and a gas concentration data based on the inspection data.

14. The method according to claim 9, further comprising:
    purging air to clean a route in front of the robot.

15. A non-transitory computer readable medium (CRM) storing instructions for performing operation of a robot that performs inspection in a facility having an operator control room, the operation comprising:
    connecting the robot to a network and launching the robot in the facility;
    receiving control signaling from the operator control room to initiate scanning;
    scanning an environment of the facility to locate an inspection item;
    autonomously driving the robot to the inspection item and aligning the robot with the inspection item for scanning;
    performing a scan of the inspection item to acquire inspection data; and
    transmitting the inspection data to the operator control room.

16. The non-transitory CRM according to claim 15, wherein the inspection item is at least one of a pipe and a tank.

17. The non-transitory CRM according to claim 16, wherein the operation further comprises:
    determining a status of the inspection item based on the inspection data; and
    transmitting the status to the operator control room.

18. The non-transitory CRM according to claim 16, wherein the operation further comprises:
    determining at least one of a thickness data and a corrosion data based on the inspection data.

19. The non-transitory CRM according to claim 16, wherein the operation further comprises:
    determining at least one of a gas type data and a gas concentration data based on the inspection data.

20. The non-transitory CRM according to claim 15, wherein the operation further comprises:
    purging air to clean a route in front of the robot.

* * * * *